United States Patent [19]

McGrath

[11] 4,115,693
[45] Sep. 19, 1978

[54] SIGNAL PROCESSING SYSTEM FOR A GAMMA CAMERA

[75] Inventor: Neal McGrath, Alexandria, Va.

[73] Assignee: Illinois Nuclear Electronics, Inc., Addison, Ill.

[21] Appl. No.: 664,631

[22] Filed: Mar. 8, 1976

[51] Int. Cl.² ............................................. G01T 1/20
[52] U.S. Cl. .............................. 250/363 S; 250/366; 250/368; 328/58
[58] Field of Search ..................... 250/369, 363 S, 366; 328/58

[56] References Cited

U.S. PATENT DOCUMENTS

| 2,755,414 | 7/1956 | Snyder | 328/58 |
|---|---|---|---|
| 3,470,482 | 9/1969 | Kolnowski | 328/58 |
| 3,573,458 | 4/1971 | Anger | 250/369 X |
| 3,594,577 | 7/1971 | Loveday | 250/369 |
| 3,638,045 | 1/1972 | Hughes | 328/58 |
| 3,919,557 | 11/1975 | Berninger | 250/369 |

Primary Examiner—Harold A. Dixon
Attorney, Agent, or Firm—Lloyd L. Zickert

[57] ABSTRACT

A signal processor for use in a system including a gamma camera and a cathode ray tube type display device for displaying the distribution of a radioactive pharmaceutical on X-ray film. The system incorporates a sample-and-hold circuit for extending the duration of each output pulse produced by the camera upon impingement of a radioactive particle. The extended pulses cause the X-ray film to be exposed for a longer period of time by the display apparatus, thereby allowing beam current in the tube to be reduced for smaller spot size and improved resolution in the image.

6 Claims, 5 Drawing Figures

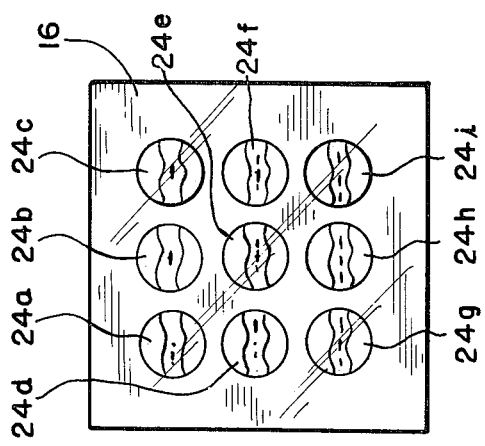
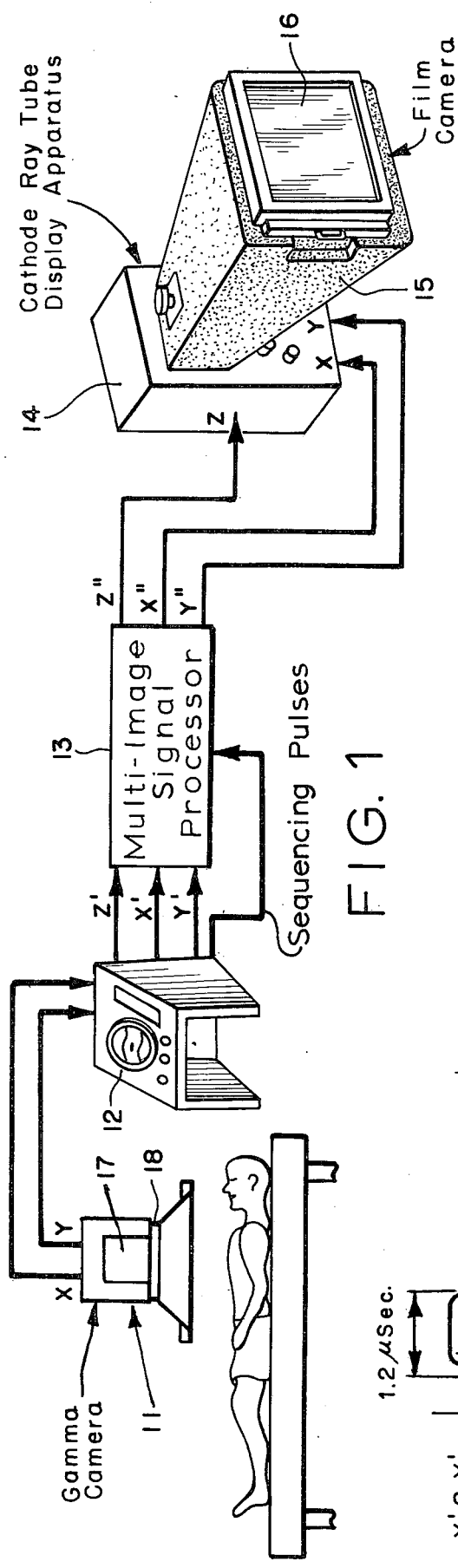
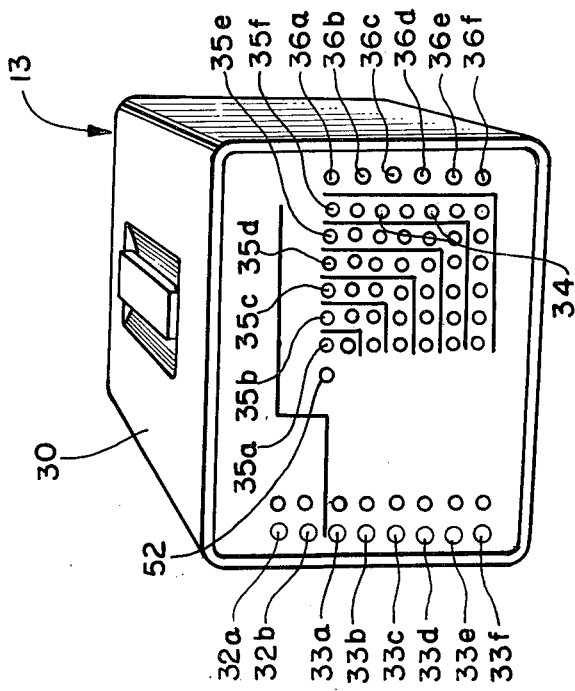
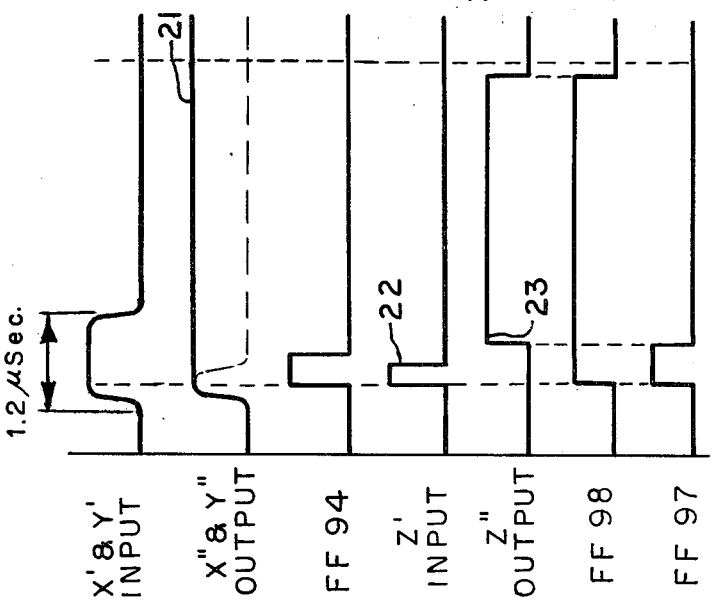

SIGNAL PROCESSING SYSTEM FOR A GAMMA CAMERA

BACKGROUND OF THE INVENTION

The present invention is directed generally to display systems for gamma cameras or the like, and more particularly to a signal processor for improving the resolution of an image produced on photographic film by such cameras.

In recent years gamma cameras have come into wide use as an aid diagnosing circulatory, respiratory and digestive tract maladies within the human body. In the operation of such cameras a radio-active pharmaceutical is injected into the body so that it can flow into the afflicted area where its presence can be determined by the gamma camera by detection of gamma rays emitted from the pharmaceutical. By observing irregularities in the flow of the pharmaceutical clots, tumors and other causal factors of the malady can be determined.

Upon impingement of a gamma particle on the gamma camera electrical signals are produced indicative of the relative location of the impingement along defined X and Y reference axes. These signals, when utilized to generate spot images on a two dimensional storage-display device, such as a cathode ray tube arranged to expose a frame of light-sensitive photographic film over a period of time, provide a display from which the location of the pharmaceutical in the patient's body can be observed. By exposing a plurality of such film frames at periodic intervals the progress of the paramaceutical with time can be observed. Because of its relatively low cost it is desirable that X-ray type photographic film be utilized for recording the spot images.

To be of maximum value to the diagnosing physician it is desirable that the image produced on the X-ray film have the highest possible resolution. However, to obtain sufficient light energy for exposing X-ray type film it has heretofore been necessary to operate the cathode ray tube at a high beam current to produce a bright spot image on the screen of the cathode ray tube coincident with each impingement of a gamma particle on the gamma camera. Unfortunately, operating the cathode ray tube with a high beam current results in the spot images being undesirably large, and as a result the reproduced image produced by exposure of the X-ray film lacking the desired definition.

The present invention is directed to an improved display system for a gamma camera wherein the X and Y signals developed by the gamma camera are processed such that adequate exposure of X-ray type photographic film is obtained without the need for high beam current in the cathode ray tube. As a result, the spot size displayed to the film is small and an image of superior resolution is produced for subsequent analysis when the film is developed.

Accordingly, it is a general object of the present invention to provide a new and improved display system for use with a gamma camera or the like.

It is another object of the present invention to provide a new and improved display system for use with gamma cameras or the like wherein improved resolution in the reproduced image is obtained.

It is another object of the present invention to provide a signal processing circuitry for use in conjunction with a gamma camera display system which enables images of improved definition to be developed on an x-ray type photographic film.

It is another object of the present invention to provide signal processing circuitry for extending the duration of output signals developed by a gamma camera to enable x-ray type photographic film to be exposed by an associated cathode ray tube display apparatus with reduced beam current for increased resolution.

It is another object of the present invention to provide a new and improved method for recording the output of a gamma camera or the like on x-ray type photographic film.

SUMMRY OF THE INVENTION

The invention is directed to a signal processor for use in a system for recording the distribution of a radioactive substance on film. The system includes a camera responsive to at least a portion of the emissions impinging from the substance for generating a location-indicative output signal of momentary duration upon each impingement, a cathode-ray tube type storage-display apparatus including a display screen and a circuit means responsive to the output signal for producing a spot image on the screen corresponding to the location of the impingement, and a film camera for exposing a frame of film to the display screen, the spot images cumulatively producing on the film the distribution pattern of the radioactive substance. The signal processor is disposed between the camera and the display apparatus and functions to extend the duration of the camera output signal for a predetermined period of time following the impingement whereby the film is exposed to the spot image for a similarly extended period of time, thereby allowing a reduction in the beam current in the cathode ray tube to obtain a smaller spot size and a more precise distribution pattern.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

FIG. 1 is a functional block diagram of a gamma camera and associated display system showing the use of a signal processor constructed in accordance with the invention.

FIG. 2 depicts a typical multi-image display as recorded on a frame of x-ray type photographic film from the cathode ray tube display apparatus utilized in the system of FIG. 1.

FIG. 3 is a perspective view of the signal processor utilized in the system shown in FIG. 1.

FIG. 4 depicts waveforms useful in understanding the operation of the signal processor.

DESCRIPTION OF THE PREFERRED EMBODIMENT

Figure 5:
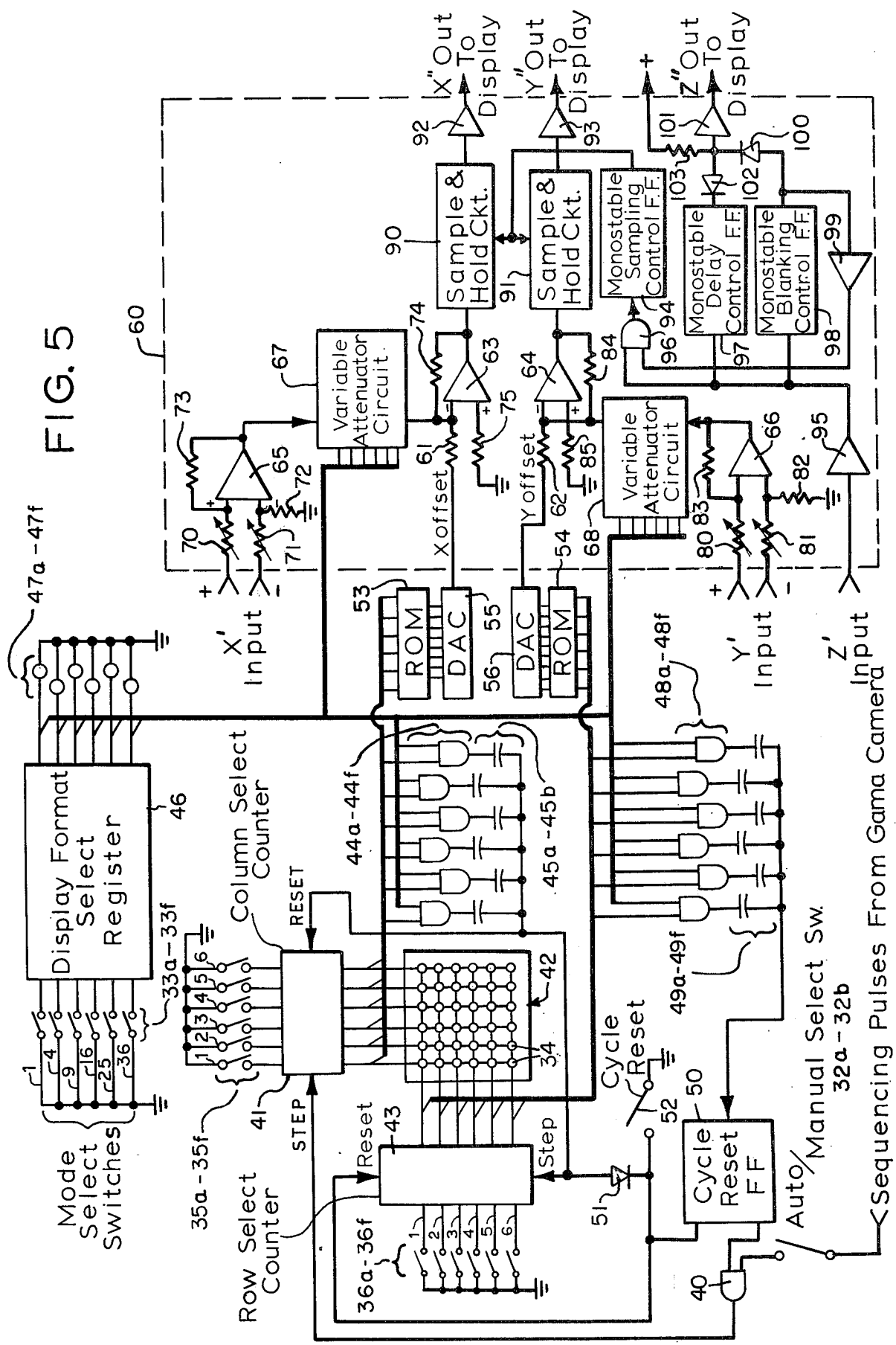
FIG. 5 is a functional block diagram, partially in schematic form, of the signal processor shown in FIGS. 1 and 2.

Referring to the FIGS., and particularly to FIGS. 1 and 2, a system for displaying and recording the flow of radioactive pharmaceuticals in a patient includes a gamma camera 11 and associated control console 12, a multi-imaging signal processor 13, a cathode ray tube display apparatus 14, and a film camera 15 for recording spot images reproduced by the display image on a frame 16 of photographic film.

The gamma camera 11, which may be conventional in design and construction, includes a camera head 17 incorporating a matrix of photo-multiplier tubes (not shown) which produce X and Y output signals representing the point of impingement of a gamma particle along X and Y references axes, respectively. A collimator in the conventional form of a lead plate 18 having a plurality of apertures perpendicular to the receptor surfaces allows only those gamma particles which impinge at right angles to the receptor surfaces to pass.

The photo-multiplier tubes in the camera head 17 may be conventional in design and construction, the gamma particles producing a scintillation on an exposed receptor surface which is electronically detected and amplified thousands of times to produce a useable signal level. The resulting signals are combined in a matrix circuit in the camera head to generate the X and Y output signals, which are processed by conventional circuitry in control console 12 to obtain X', Y' and Z' signals useful in driving a cathode ray tube type display apparatus.

In operation, a radioactive pharmaceutical is injected into the patient and the gamma camera 11 is positioned to intercept gamma radiation emitted by the pharmaceutical from inside the patient's body. The X and Y electrical signals generated as a result of impingement of gamma radiation on the camera head are utilized to produce a realtime display on the camera control console 12 to assist the operator in positioning the camera and ascertaining its proper operation.

To record the image produced by the camera in a form which allows subsequent examination by an attending physician, the gamma camera preferably includes circuitry for producing X', Y' and Z' output signals suitable for driving a cathode ray tube type display apparatus from which photographic film can be exposed. In such apparatus the X' and Y' signals typically control the positioning of the electron beams and the Z' signal controls the occurrence of the beam.

The multi-imaging signal processor stage 13 includes circuitry for conditioning the X', Y' and Z' output signals to enable multiple images to be exposed onto a single frame of photographic film. A typical multi-image display is shown in FIG. 2, wherein nine separate images are displayed in a 3 × 3 matrix on the single frame 16 of photographic film.

For reasons of convenience of handling and processing, and for greater economy, it is preferred that x-ray type photographic film be utilized in camera 15. For this reason the multi-image signal processor 13 also includes, in accordance with the invention, signal processing circuitry for extending the duration of the X',Y' and Z' signal produced by gamma camera 11 upon incidence of a gamma particle. This stretching of the gamma camera output signals allows the x-ray film to be exposed with the cathode ray tube display apparatus 14 operating at a lower brightness level (and hence at a lower beam current) since the film is exposed to each spot image for a longer period of time. By reason of the lower beam current the size of the spot images produced is reduced and the resolution of the image produced of the x-ray film is improved.

The effect of the multi-imaging signal processor 13 on the X', Y' and Z' signal developed by the gamma camera is shown in FIG. 3. The X' and Y' signals, as shown by waveform 20, have a duration of approximately 1.2 microseconds as developed by the gamma camera. As shown by waveform 21, these X' and Y' signals are stretched or extended by the signal processor to a duration of approximately 9.0 microseconds. It is these extended X'' and Y'' signals which are applied to the cathode ray tube display apparatus 14 so that each spot displayed on the screen of the display apparatus has a longer duration. Similarly, the Z' output signal from the gamma camera has a duration of approximately 1.0 microseconds, as shown by waveform 22. This Z' signal is delayed approximately 0.5 microsecond and extended by the processor to 8.0 microseconds, as shown by waveform 23, prior to being applied to the display apparatus.

The multi-imaging processor 13 also includes circuitry which enables a plurality of individual images to be displayed or exposed on a single frame of x-ray film. This not only saves the cost of providing individual frame of film for each image but also allows for more convenient examination by the physician. In FIG. 2 nine individual images 24a–24i taken in chronological order to observe the change in distribution of a radioactive pharmaceutical with time are arranged in a 3 × 3 display matrix. It will be appreciated that other formats having a greater or lesser number of individual images may be provided. For example, a 6 × 6 matrix having 36 individual images could be presented.

During exposure of the multiple images the film frame 16 is held in a stationary position in camera 15, which is preferably constructed as shown and claimed in copending application Ser. No. 609,444 filed Sept. 2, 1975, now U.S. Pat. No. 4,001,847 in which the present applicant is a co-inventor. The individual images are then exposed onto the film, one at a time, left-to-right and top-to-bottom. Processor 13 provides the necessary conditioning of the X' and Y' signals to obtain the correct positioning and size for each image.

Referring to FIG. 4, the processor 13 is preferably contained in a cabinet 30 which includes a control panel 31. Selection between an AUTOMATIC mode, wherein stepping from one image position to another is accomplished. automatically on the completion of a scan by the gamma camera, and a MANUAL mode, wherein each image position is independently selected, is accomplished by push button switches 32a and 32b. The number of images and the format of the images to be displayed on a single frame of film is selected by push button switches 33a–33f. Selection of 1, 2 × 2, 3 × 3, 4 × 4, 5 × 5, and 6 × 6-image formats can be made by momentarily depressing a respective one of these switches. The processor 13 also includes a 6 × 6 matrix of indicator lights 34 for indicating the position of the image being displayed as well as six individual push button switches 35a–35f for manually selecting the column and six individual push button switches 36a–36f for manually selecting the row of a particular display position to be next utilized.

In operation, upon completing the scan of an image gamma camera 17 produces a sequencing pulse which is applied to processor 13. In the AUTOMATIC mode this pulse steps the processor to the next image position in the selected display format. This is accomplished without the attention of the operator, allowing the operator to concentrate on operation of the gamma camers. Since only one image is displayed at a time on the display screen of the cathode ray tube display apparatus 14 no shutter is necessary on film camera 15. The film 16 remains exposed to the display screen continuously during the entire scanning operation and is removed only after all images to be placed on the film frame have been completed.

Referring now to FIG. 5, sequencing pulses from gamma camera 11 are applied through the AUTO-MANUAL selector switch 32 to an AND gate 40. When this gate is enabled the sequencing pulses are applied to the stepping input of a column-stepping counter 41. Depending on the counting state of counter 41 an output is developed on one of six individual output. Counter 41 will normally have an initial counting state of one, but may be preset to any one of its six counting states by means of the individual column-select push button switches 35a-35f. The outputs of counter 41 are connected to respective columns if a 6 × 6 image position display matrix 42 consisting of the 36 image position indicating lamps 34. To illuminate one of these lamps it remains for a complementary output signal to be provided to one of the rows in the matrix. This is accomplished by a row-select counter 43 having six outputs connected to respective rows in the display matrix. As with counter 41, counter 42 normally has an initial counting state of one but can be preset to any of the six counting states by means of the row-select push button switches 36a-36f. Thus, the particular lamp illuminated in display matrix 31 depends on both the counting state of counter 41 and the counting state of counter 42.

In operation, images are displayed on the display screen of the display apparatus 14 progressing from left-to-right and top-to-bottom in the selected display matrix. Thus, after the last image position available in a row of the matrix has been displayed the next image is displayed in the first position in the next row. This requires that counter 41 be reset to its initial counting state upon completion of the last available image in each row and that counter 42 be stepped to its next counting state. This is accomplished by means of six AND gates 44a-44f and associated differentiating networks in the form of capacitors 45a-45f.

One input terminal of each of AND gates 44a-44f is connected to a respective one of the outputs of a six position display format select register 46. The counting state of register 46 is set by the user by means of the display format select switches 33a-33f to select one of the six possible display formats, i.e. 1, 2 × 2, 3 × 3, 4 × 4, 5 × 5 and 6 × 6. An indication of the matrix format selected is obtained by means of individual indicator lamps 47a-47f associated with respective ones of the outputs of register 46. Thus, the display format selected by the operator determines which one of AND gates 44a-44f is enabled. Since the other inputs of AND gates 44a-44f are connected to respective ones of the outputs of the column select counter 41, the enabled AND gate establishes the highest counting state which will be reached by counter 41 for the selected display format. The pulse developed at the output of the enabled AND gate and its associated differentiating network upon counter 41 reaching its highest possible counting state is applied to the reset input of counter 41 to return that counter to its initial counting state and to the stepping input of counter 43 to advance that counter to its next counting state. This process is repeated as the last frame position to be utilized in each row of the selected display format has been filled.

Upon completion of the image in the last available column of the last available row for a particular display format further stepping of counter 41 is prevented by means of AND gates 48a-48f and their associated differentiating networks in the form of capacitors 49a-49f. One input of each of AND gates 48a-48f is connected to a respective output of the display format select register 46 such that a selected one of the AND gates is enabled to develop an output pulse in conjunction with its associated differentiating network upon completion of the last image to be displayed in the selected format. This pulse is applied to a cycle reset flip-flop 50 which assumes a set state upon receipt of the pulse. The output of flip-flop 50 is connected to the remaining input of AND gate 40 such that when flip-flop 50 is in its set state AND gate 40 is inhibited. This prevents the further application of sequencing pulses to the column-select counter 41 and thereby terminates the display sequence. The change of flip-flop 50 to its set state simultaneously resets the row-select counter 43 and, by way of a diode 51, resets the column-select counter 41. Thus, both counters 41 and 43 are returned to their initial counting states. The counters may be also reset manually at any time by momentary actuation of the manual cycle reset push button switch 52.

To control the position of the displayed image on the display screen of the cathode ray tube display apparatus 14 the outputs of counters 41 and 43 are applied to the inputs of respective read only memories (ROMs) 53 and 54, respectively. These ROMs develop from the six output signals of the counters eight bit binary-coded decimal (BCD) signals which are applied to respective ones of two digital-to-analog converters (DACs) 55 and 56, respectively. These DACs develop analog output signals having a predetermined voltage level for each possible BCD input signal applied. Thus, discrete predetermined analog voltages, henceforth termed X and Y offsets, are developed for each of the counting states of counters 41 and 43. These offsets are utilized by the signal processing or dot minification circuits 60 of the processor 13 in positioning the reproduced image on the display screen.

The positive and negative polarity X′ input terminals are coupled through resistors 70 and 71 to the non-inverting and inverting input terminals of differential amplifier 65. The inverting terminal of this amplifier is also connected to ground by a resistor 72 and the non-inverting terminal is also connected to the output of the amplifier by a feedback resistor 73. The output of amplifier 65 is connected through the variable attenuator circuit 67 to the inverting input terminal of differential amplifier 63, which is also connected to the output of that amplifier by a feedback resistor 74. The non-inverting input of amplifier 63 is connected to ground by a resistor 75. As a result of this arrangement that net voltage level at the output of amplifier 63 is a composite of the applied X′ input signal and the X offset.

The positive and negative polarity Y′ input terminals are similarly coupled to the non-inverting and inverting input terminals of differential amplifier 66 by means of variable resistors 80 and 81. The inverting terminal is connected to ground by a resistor 82 and the non-inverting terminal is connected to the output of the amplifier by a feedback resistor 83. The output of amplifier 66 is applied through the variable attenuator circuit 68 to the inverting input terminal of differential amplifier 64, which is also connected to the output of that amplifier by a feedback resistor 84. The non-inverting input of amplifier 64 is connected to ground by a resistor 85. As a result of this arrangement the voltage level at the output of amplifier 64 is a composite of the level of the Y bias signal and the Y' input signal.

The X and Y composite signals developed at the outputs of amplifiers 63 and 64 are applied to respective ones of two sample-and-hold circuits 90 and 91, which may be conventional in construction and operation. These circuits function in a manner well known to the art to develop an output signal having a level identical to the level of the last applied input signal for a hold period determined by an applied control signal. Buffer amplifiers 92 and 93 are connected to the outputs of the sample-and-hold circuits 90 and 91 to amplify the processed signals developed in these circuits to a level suitable for application to the cathode ray tube display apparatus 14.

The operation of the sample-and-hold circuits 90 and 91 is controlled by a monostable sampling control flip-flop 94. To control this flip-flop the Z' input signal from gamma camera 17 is applied through an amplifier 95 to one input of an AND gate 96. The output of AND gate 96 is applied to the sample control flip-flop 94 such that when AND gate 96 is enabled the receipt of a Z input pulse triggers flip-flop 94. This flip-flop assumes a set state for a predetermined period of time during which the sample-and-hold circuits 90 and 91 and rendered operative. As a result, the last applied X and Y composite signals from differential amplifiers 63 and 64 are retained in the sample-and-hold circuits for a predetermined period of time.

The Z' input signal, after amplification by amplifier 95, is also applied to a monostable delay control flip-flop 97 and a monostable blanking control flip-flop 98. Upon receipt of a Z' pulse flip-flop 98 switches to a set state for a predetermined period of time and in so doing produces an output signal which is applied through an isolation amplifier 99 to the remaining input of AND gate 96. This serves to inhibit AND gate 96 for as long as flip-flop 98 is in its set state to prevent a second Z input pulse from initiating operation of the monostable sampling control flip-flop 94 before the holding period of the sample-and-hold circuits has been completed and the X-ray film in film camera 16 has been completely exposed. The output of the blanking control flip-flop 98 is also applied through a diode 100 to an inverter amplifier 101 for application to the Z input of the cathode ray tube display apparatus 14. This assures that the cathode ray tube beam will be operative for a sufficient period of time to adequately expose the x-ray film. The actual period of operation of the cathode ray tube beam is rendered slightly shorter in duration than the set period of flip-flop 98 by means of the monostable delay control flip-flop 97 which has a short set period upon receipt of a Z input pulse than flip-flop 98. When flip-flop 97 is in its set state the input of amplifier 101 is inhibited through a diode 102 and resistor 103 to B+ and the display is delayed. This insures that the display on the cathode ray tube will not begin until the sample-and-hold circuits 90 and 91 have developed an output state corresponding to the peak level of the applied X' and Y' signals from gamma camera 11.

The electron beam remains on until flip-flop 98 returns to its reset state. The set period of flip-flop 94 is longer than the set period of flip-flop 98 to insure that the X" and Y" signals applied to the display apparatus 14 will be held constant by the sample-and-hold circuits 90 and 91 until the electron beam has been extinguished.

Thus, the multi-imaging signal processor provides in addition to the function of enabling multiple images to be produced on a single film frame, the additional function of dot minification whereby images can be produced economically on ordinary x-ray type film with improved definition. The processor is self-contained, economical to construct and reliable in operation. By reason of its provisions for automatic operation and manual override the apparatus can accommodate various specialized research requirements without the need for additional or ancillary circuitry or equipment.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a system for recording the distribution of a radioactive substance on film, said system including a camera responsive to at least a portion of the emissions impinging from said substance for generating position-indicative output signals each including X, Y, and Z components of predetermined momentary duration upon each impingement;

a storage-display apparatus including a cathode-ray tube having a display screen and circuit means responsive to said output signals for producing spot images on said display screen corresponding to the locations of each of said impingements; and a film camera for exposing a frame of film to said display screen, said film responding to application of a predetermined quantum of light from said spot images to record said spot images, the cumulative recording of said spot images on said film illustrating the distribution pattern of said radioactive substance; the improvement comprising: a signal processor including first and second sample and hold circuits disposed between said camera and said display apparatus and responsive to an applied control signal, and control circuit means responsive to said Z component for generating a control signal for application to said first and second sample and hold circuits to extend the duration of said X and Y components from said camera to respective first and second predetermined intervals greater than said momentary duration of said X and Y components, and for extending the duration of said Z component to a third predetermined interval greater than said predetermined momentary duration of said Z component but less than said first and second predetermined intervals, whereby the duration of said spot images on said display screen is extended to said third predetermined interval to allow production of said predetermined quantum of light by said cathode-ray tube at a reduced beam current for improved resolution.

2. A system for recording the distribution of a radioactive substance on film as defined in claim 1 wherein said sample and hold circuits are non-responsive to applied X and Y components from said camera while conditioned by said control circuit to extend said components, and wherein said control circuit is non-responsive to an applied Z component during generation of said control signal.

3. A system for recording the distribution of a radioactive substance on film as defined in claim 2 wherein said control signal is generated by said control circuit after elapse of a predetermined delay period following occurrence of said Z component.

4. A system for recording the distribution of a radioactive substance on film as defined in claim 1 wherein said signal processor includes:
 a first circuit responsive to a first offset control signal for adding an offset voltage to said X component;
 a second offset circuit responsive to a second offset control signal for adding an offset voltage to said Y component;
 means including a first step counter for generating said first offset control signal, the magnitude of said first offset signal being dependent on the counting state of said counter;
 means including a second step counter for generating said second offset control signal, the magnitude of said second offset signal being dependent on the counting state of said counter; and
 step pulse generator means for stepping said first counter upon completion of a complete scanning cycle by said camera, and for stepping said second counter upon said first counter reaching a predetermined counting state.

5. A system for recording the distribution of a radioactive substance on film as defined in claim 12 wherein said signal processor further includes display format selection means for establishing said predetermined counting state.

6. A system for recording the distribution of a radioactive substance on film as defined in claim 5 wherein said signal processor further includes:
 first variable attenuator means responsive to an applied control signal for attenuating said X component;
 second variable attenuator means responsive to an applied control signal for attenuating said Y component;
 and wherein said display format control circuit includes means for generating said attenuator control signals to scale said cumulative recording according to the display format selected.

* * * * *